Oct. 26, 1926.
A. E. McNABB
1,604,464
FEEDING DEVICE FOR WIRE FABRIC MACHINES
Filed Jan. 30, 1925   2 Sheets-Sheet 1
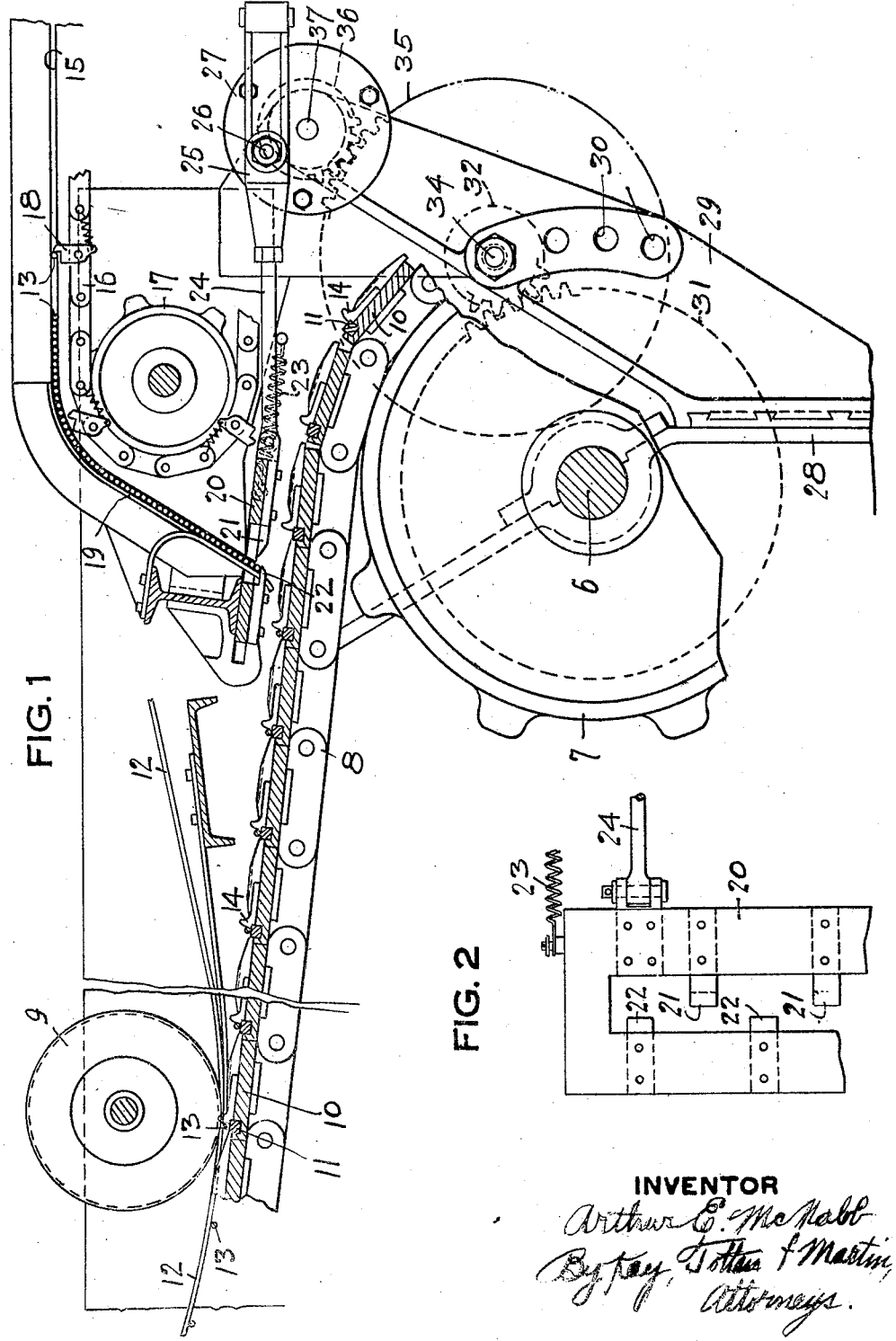
INVENTOR
Arthur E. McNabb
By Kay, Totten & Martin
Attorneys.

Oct. 26, 1926.  
A. E. McNABB  
1,604,464  
FEEDING DEVICE FOR WIRE FABRIC MACHINES  
Filed Jan. 30, 1925  2 Sheets-Sheet 2
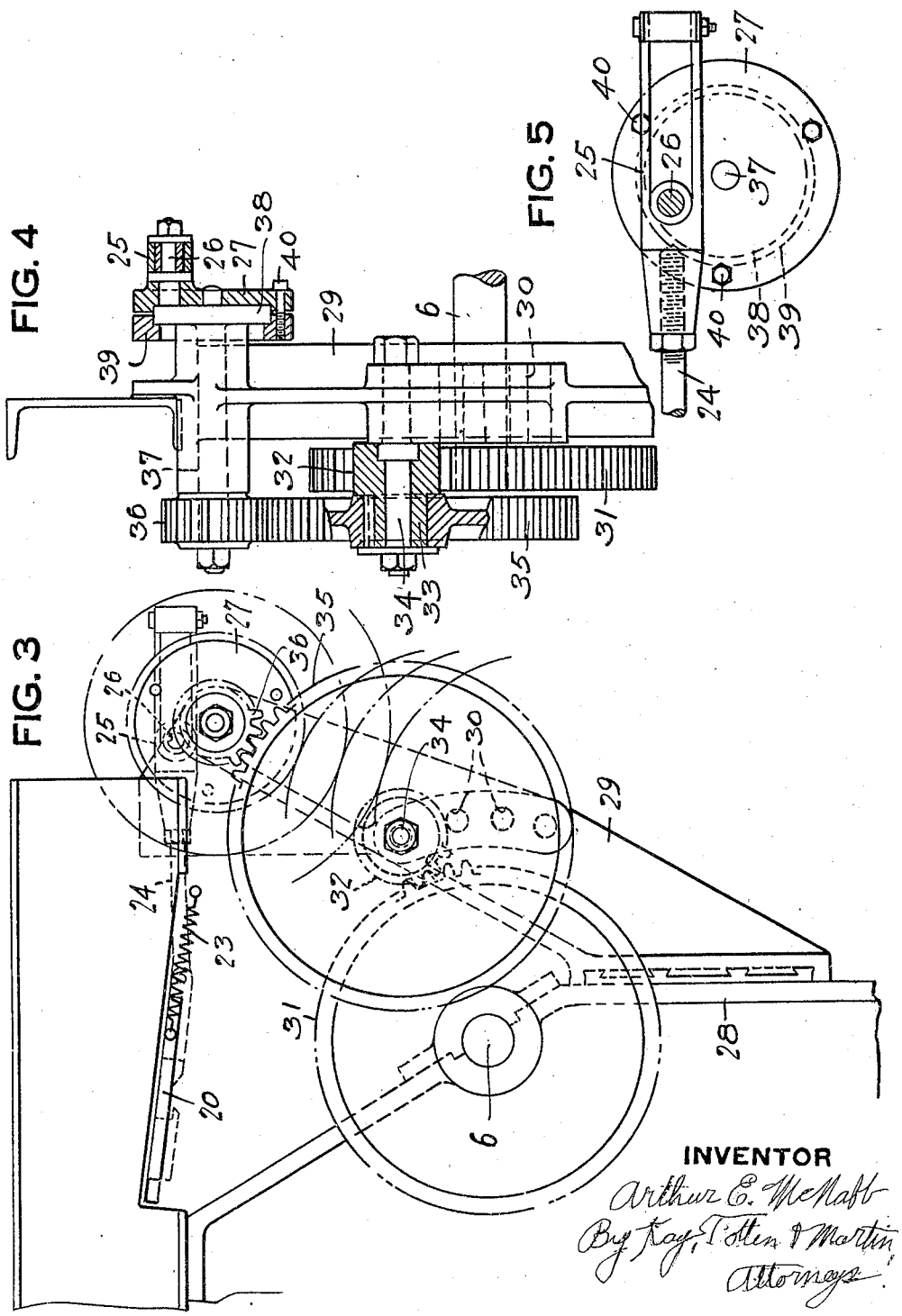
INVENTOR  
Arthur E. McNabb  
By Kay, Totten & Martin  
Attorneys Patented Oct. 26, 1926.

1,604,464

UNITED STATES PATENT OFFICE.

ARTHUR E. McNABB, OF MONESSEN, PENNSYLVANIA, ASSIGNOR TO PITTSBURGH STEEL COMPANY, OF PITTSBURGH, PENNSYLVANIA, A CORPORATION OF PENNSYLVANIA.

FEEDING DEVICE FOR WIRE-FABRIC MACHINES.

Application filed January 30, 1925. Serial No. 5,779.

My invention relates to feeding device for wire fabric machines, and particularly to a means for feeding the stay or cross wires to the machine wherein they are secured to the strand wires.

My invention has for its object the provision of means for feeding stay wires in various timed relations to the movement of the strand wires through the machine.

Another object of my invention is to simplify and improve generally the structure and operation of feeding devices for rods, wires and the like.

While my invention is shown as applied to a wire fabric machine, it will be apparent that it may be applied in other relations.

One form which my invention may take is shown in the accompanying drawing wherein Fig. 1 is a fragmentary elevational view of a portion of a welding machine to which my invention is applied; Fig. 2 is a plan view of a portion of the stay wire feeding bar of Fig. 1; Fig. 3 is a side elevational view of a portion of the apparatus of Fig. 1; Fig. 4 is a sectional view looking from the front of Fig. 3, and Fig. 5 is a side elevational view, on an enlarged scale, of a portion of the mechanism of Figs. 3 and 4.

For convenience of illustration I have shown my apparatus in connection with a portion of an electric welding machine for making wire fabric, only so much of the machine being shown as is necessary to an understanding of my invention.

The machine is provided with a main drive shaft 6 upon which is mounted a sprocket wheel 7 that moves a carrier or conveyor 8 past roller electrodes 9, only one of which is shown. The carrier 8 is provided with anvil bars 10 and electrode bars 11 that extend transversely of the carrier for a distance sufficient to weld the width of fabric desired. A plurality of roller electrodes 9 are provided in axially spaced relation for a distance substantially equal to the length of the welding bars 11, and a strand wire 12 is fed between the roller electrode 9 and the electrode bars 11, by any desired means as by movement of the carrier itself pulling them along. The strand wire 12 passes beneath each electrode 9 and is welded to the stay wires 13 by an electric current flowing through electrodes 9 and 11 at the instant that such stay wires reach a point between said electrodes. The stay wires 13 are held in transversely aligned position upon the carrier 8 by means of blocks 14 that are mounted thereon. The blocks also feed the fabric along, by reason of their continued engagement with the stays 13 after they are welded to the strand wires. Current may be passed through the electrodes 9 and 11 when the wires are carried therebetween, from any desired source, and in a manner well known in the art. It will be understood that at the opposite end of the machine a shaft and sprocket similar to the shaft 6 and the sprocket 7 are provided, and that either of the shafts may be driven from any desired source of power.

Stay wires 13 are supplied to a feed table 15 in any desired manner and are fed forwardly thereon by means of a pair of chains 16 (only one of which is shown), mounted adjacent to opposite edges of the table and passing around sprockets 17. At intervals the chains 16 are provided with pivoted dogs 18 that engage the stay wires 13 and carry them forward to the inclined portion so as to maintain the stay wires in proper alignment.

Beneath the portion 19 of the table I mount a slidable plate or bar 20 that is provided with blade members 21 and shelf-like projections 22, as shown more closely in Fig. 2. The central portion of the plate 20 is cut out as indicated in Fig. 2 and the outer end of the members 21 and 22 are so spaced that the stay wire 13 may fall between them when desired. Springs 23 at each end of the plate 20 normally hold it in retracted position with the shelf-like projections 22 lying beneath the stay wires contained in the inclined portion 19 of the table.

In order to permit release of one of the wires, the plate 20 is moved forward against tension of the springs 23 in a manner to be hereinafter described. During this movement the fingers 22 pass from beneath the stay wires and simultaneously the blades 21 enter between the bottom-most stay wire and the wire next above it, thus supporting the wires thereabove at the time that the fingers 22 release the bottom wire. Upon retraction of the plate 20 the fingers 22 will move into the position shown in Fig. 1 at the time that the blades 21 pass from beneath the stay wires, thus permitting the stay wires to move down into engagement with the fingers 22, so that another wire can be separated therefrom upon the next advancing movement of the plate 20.

The plate 20 is reciprocated by means of a pitman that is composed of a push rod 24 that has screw threaded engagement with a socket in a link 25. The other end of the push rod 24 is pivotally connected to the plate 20. The link 25 is supported on a wrist pin 26 that is secured to a crank disc 27. The crank disc 27 is mounted and driven in a manner to be now described.

Bolted to the frame-work 28 of the machine which supports the shaft 6 is a bracket casting 29 that is provided with a series of openings 30 arranged concentrically to the shaft 6. A gear wheel 31 is secured to the shaft 6 and rotates therewith. The gear 31 meshes with a smaller gear wheel 32 that has an extended hub portion 33 which is mounted upon a shaft 34 that extends through one of the openings 30 in the casting 29. The extended hub portion 33 serves also as a shaft for a gear wheel 35 that is connected to said hub. The gear wheel 35 in turn meshes with a gear wheel 36 that is mounted upon a shaft 37 which is supported in the upper end of the bracket 29.

The shaft 37 is provided with a disk-like flange 38 and extends through a hole centrally disposed in the crank disc 27. The crank disc 27 is clamped to the flange 38 by a clamping ring 39 and screws 40 which draw the clamp ring and the crank disc into tight engagement with the flange 38, so that the parts rotate in unison. It will be seen that by slightly loosening the screws 40 the crank may be adjusted rotatably on the shaft 37 and with respect to the gear wheel 36, for a purpose to be hereinafter explained. It will be understood that the apparatus shown in Fig. 4 is duplicated at each side of the machine, to operate the feed bar 20 at both of its ends.

Inasmuch as the gear wheel 31 is mounted upon the main driving shaft 6 of the machine the crank discs 27 will be driven, to reciprocate the feed bar 20 and to effect dropping of a stay wire upon the conveyor 8 at each revolution of said crank disc. It will be further understood that the number of revolutions of the crank disc during a given number of revolutions of the shaft 6 depends upon the gear reduction. Herein resides an important feature of my invention.

I preferably effect this change in speed reduction by substituting gear wheels of different dimensions for the gear wheel 36. For instance, the speed reduction between the gear wheel 31 and the gear wheel 35 may be such that if the gear wheel 36 is 6″ in diameter, the feed plate 21 will be reciprocated once for each 6″ movement of the conveyor 8, thus depositing the stay wires at intervals of six inches thereon. Similarly, if the gear wheel 36 be a 12″ gear wheel, stay wires will be deposited on the conveyor at intervals of twelve inches; with an 18″ gear wheel at 36 the stay wires would be spaced eighteen inches apart, and so on. In order to permit the substitution of a larger gear wheel at 36, the shaft 34 that carries the gear wheels 32 and 35 is moved into an opening 30 in the bracket 29 that will permit it to register properly with the substituted gear wheel. The holes 30 are of course so spaced that when the shaft 34 is mounted in a given hole, the gear wheel 35 will mesh with a given sized gear wheel 36. The arcuate arrangement of the holes 30 insures that the gear wheel 32 will at all times mesh with the gear wheel 31.

The rotatable adjustability of the crank discs 27, as above described, permits the two crank discs, which are at opposite sides of the machine, to be properly adjusted with respect to one another, so that both ends of the feed bar 20 will be in proper alignment. This adjustment may also be made in order to insure that the stay wires will be deposited upon the conveyor at exactly the desired point with respect to the guide blocks 14 and the welding bars 11.

Another means for effecting adjustment of the feed plate 20 is found in the threaded connection of the rods 24 with the links 25. The adjustments may be made either to compensate for slight wear in the machine and consequent irregularities, or to insure proper alignment of the feed plate and proper placing of the stay wires upon the machine, as above explained.

I claim as my invention:

1. The combination with a metal fabric welding machine and carrier mechanism for moving strand wires therethrough in a substantially horizontal direction, of a slide for supporting stay wires above the plane of travel of the carrier, means variably controlled by said mechanism for operating the slide to release the stay wires, the said means comprising interchangeable speed gears operated by said mechanism and having eccentric connection to said slide to effect reciprocation thereof, and a rotatably adjustable connection for varying the angle of said eccentric with respect to said gears.

2. The combination with a carrier provided with a plurality of electrode bars for supporting stay wires in position to be welded to strand wires, of a slide for supporting said wires above the plane of travel of the carrier, change speed gears driven in predetermined relation to the movement of the carrier, a disc driven by said gears, a crank disc rotatably connected to the first-named disc, and a link connection between said crank disc and the slide for operating said slide to drop stay wires upon said carrier.

In testimony whereof I, the said ARTHUR E. MCNABB, have hereunto set my hand.

ARTHUR E. McNABB.